(12) United States Patent
McCarter

(10) Patent No.: US 9,845,042 B1
(45) Date of Patent: Dec. 19, 2017

(54) RETENTION STRAP STABILIZATION DEVICE

(71) Applicant: Jeremy M. McCarter, Dallas, TX (US)

(72) Inventor: Jeremy M. McCarter, Dallas, TX (US)

(*) Notice: Subject to any disclaimer, the term of this patent is extended or adjusted under 35 U.S.C. 154(b) by 0 days.

(21) Appl. No.: 15/449,282

(22) Filed: Mar. 3, 2017

Related U.S. Application Data

(60) Provisional application No. 62/303,004, filed on Mar. 3, 2016.

(51) Int. Cl.
*B60P 7/08* (2006.01)

(52) U.S. Cl.
CPC .......... *B60P 7/0869* (2013.01); *B60P 7/0823* (2013.01)

(58) Field of Classification Search
CPC ........ B60P 7/08; B60P 7/0823; B60P 7/0869; F16B 2/00
USPC ........ 410/41, 96, 97, 99, 155; 206/453, 586; 248/345.1
See application file for complete search history.

(56) References Cited

U.S. PATENT DOCUMENTS

| 7,258,516 B1* | 8/2007 | Collins | B60P 7/0807 |
| | | | 410/99 |
| 2008/0069657 A1* | 3/2008 | George | B60P 7/0869 |
| | | | 410/96 |

* cited by examiner

*Primary Examiner* — Stephen T Gordon
(74) *Attorney, Agent, or Firm* — Richard G. Eldredge; Eldredge Law Firm

(57) ABSTRACT

A Retention Strap Stabilization Device is provided that improves the safety and longevity of retention straps used to secure cargo in transportation. The Retention Strap Stabilization Device has a foil body and a strap retaining slot, where in use, the foil body effectively lengthens the trailing edge of a retention strap thus changing the resonant frequency of the retention strap to prevent oscillation of the retention strap while in use on a moving vehicle. The device is held in place by a plurality of retention grips that embed themselves in the retention strap. The device not only prevents damage and resulting breakage of retention straps and the associated safety implications, but also reduces the potential for damage to the cargo being secured by the retention straps when unwanted oscillations of retention straps occur during transit.

7 Claims, 6 Drawing Sheets

RETENTION STRAP STABILIZATION DEVICE

BACKGROUND

1. Field of the Invention

The present invention relates generally to load retention devices, and more specifically to a stabilization device for retention straps that prevents load retention straps from oscillating while in transit.

2. Description of Related Art

Trucks and trailers often employ load retention devices to secure their loads while traveling on a roadway. Such load retention devices are required not only for the safety and security of the load itself, but also for the safety and security of other drivers, pedestrians, and structures adjacent to the roadway. As such, the ongoing structural integrity of the load retention device is of utmost importance. Generally either chains or straps are used for load retention devices. Nylon or similar synthetic materials are often used for retention straps; these straps being very commonplace due to ease of use and reasonable cost as compared to chains. Retention straps, however, present a unique challenge to their ongoing viability and safety over time. Being flexible and susceptible to wear, the leading edge of a retention strap in use tends to catch the airflow from movement of the transport vehicle and can oscillate and create harmonic vibrations that are detrimental to the integrity of both the retention strap and the load. While these vibrations may be annoying to both the driver of the truck as well as other drivers in proximity to the truck, they also create aerodynamic inefficiencies as well as load damage Tightening the retention straps can sometimes reduce this vibration, but this approach is often ineffective with older, worn straps, or on taller loads with more strap exposed. In addition, truckers hauling fragile or easily damaged loads such as asphalt shingles, drywall, or the like, purposely keep their straps relatively loose to prevent load damage caused by excessive retention strap pressure crushing.

Some truckers have come up with a simple solution to the problem of retention strap vibration; they will put a half-twist in the retention strap between the load and the trailer retention point for the strap. However, some states prohibit twisting of retention straps, stating that the strap is not making the most direct, and therefore strongest path to the trailer. The twist also creates additional aerodynamic drag, as ¼ to ⅓ of the strap length is prone to the wind. This may not seem too significant at first, but with some trailers using up to 10 straps per side, this results in as many as 20 small inefficiencies dragging through the air for hundreds or thousands of miles, resulting in increased fuel consumption and associated costs.

What is needed is a device that prevents oscillation of a retention strap while maintaining overall strength and longevity of the retention strap.

It is therefore an object of the present invention to provide a stabilization device for a retention strap that maintains overall strength and longevity of the retention strap while being easy to use and low cost.

These and other objects of the present invention are not to be considered comprehensive or exhaustive, but rather, exemplary of objects that may be ascertained after reading this specification with the accompanying drawings.

BRIEF SUMMARY OF THE INVENTION

In accordance with the present invention, there is provided a retention strap stabilization device comprising a foil side and a strap retaining side, where in use the foil side effectively lengthens the trailing edge of a retention strap by changing the resonant frequency of the retention strap to prevent oscillation of the retention strap while in use on a moving vehicle. The foregoing paragraph has been provided by way of introduction, and is not intended to limit the scope of the invention as described by this specification and the attached drawings.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
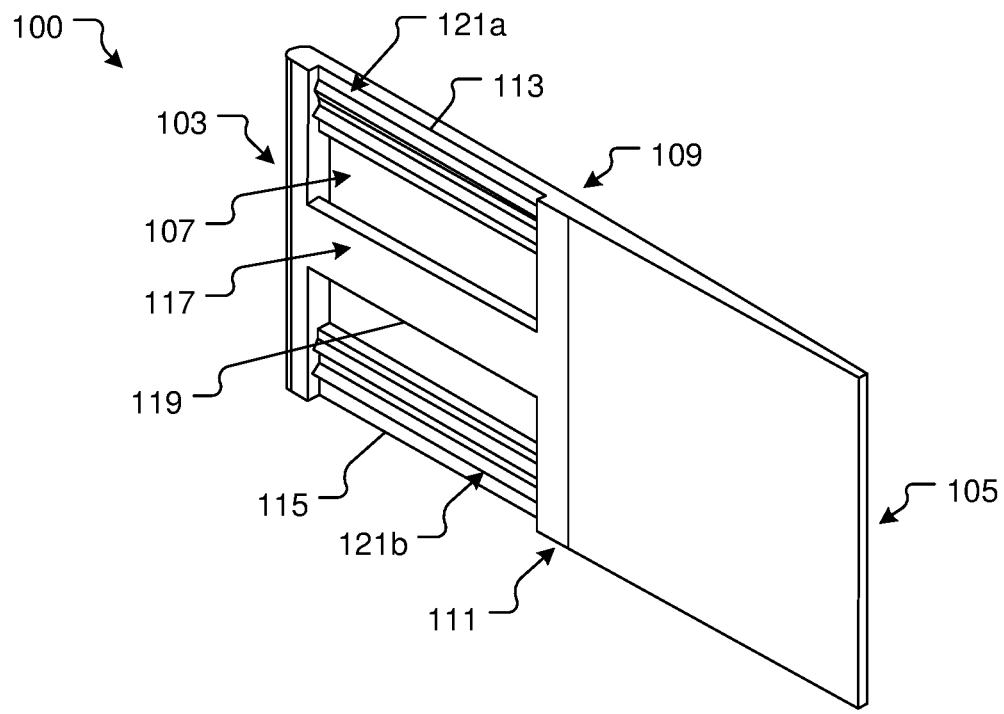
FIG. 1 is a perspective view of the retention strap stabilization device of the present invention.

While the device and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

A retention strap stabilization device is described herein. To prevent unwanted oscillation of retention straps such as nylon webbing straps while a vehicle such as a trailer is in motion, the present invention includes a foil integrated with a plurality of retention grips that can be easily attached to a retention strap to provide a "rudder" effect where the foil effectively lengthens the trailing edge of a retention strap, changing the resonant frequency of the retention strap and thus preventing the leading edge of the retention strap from beginning to oscillate in the moving airflow of a vehicle. The retention strap stabilization device attaches to the retention strap without the risk of vibrations and resulting load or retention strap damage, and further provides aerodynamic efficiencies to improve fuel economy.

The retention strap stabilization device that is described, depicted and envisioned herein includes a foil and a retention grip. Several embodiments are described and depicted herein by way of example, and not limitation.

The retention strap stabilization device may be made from any suitable rigid or semi-rigid material, for example, a plastic. Examples of suitable plastics include acrylonitrile butadiene styrene (ABS), polyethylene, polypropylene, polystyrene, polyvinyl chloride, polytetrafluoroethylene, and the like. Bioplastics may also be used in some embodiments of the present invention. In addition, reinforced plastics, metals, wood, fiberglass, or other materials that may be suitably formed may also be used. The retention strap stabilization device may be made by injection molding, blow molding, machining, extruding, or the like. Additional hardware and components made of different or similar materials may also be added to the retention strap stabilization device Illustrative embodiments of the device and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiments herein described are not intended to be exhaustive or to limit the invention to the precise form disclosed. They are chosen and described to explain the principles of the invention and its application and practical use to enable others skilled in the art to follow its teachings.

Figure 2:
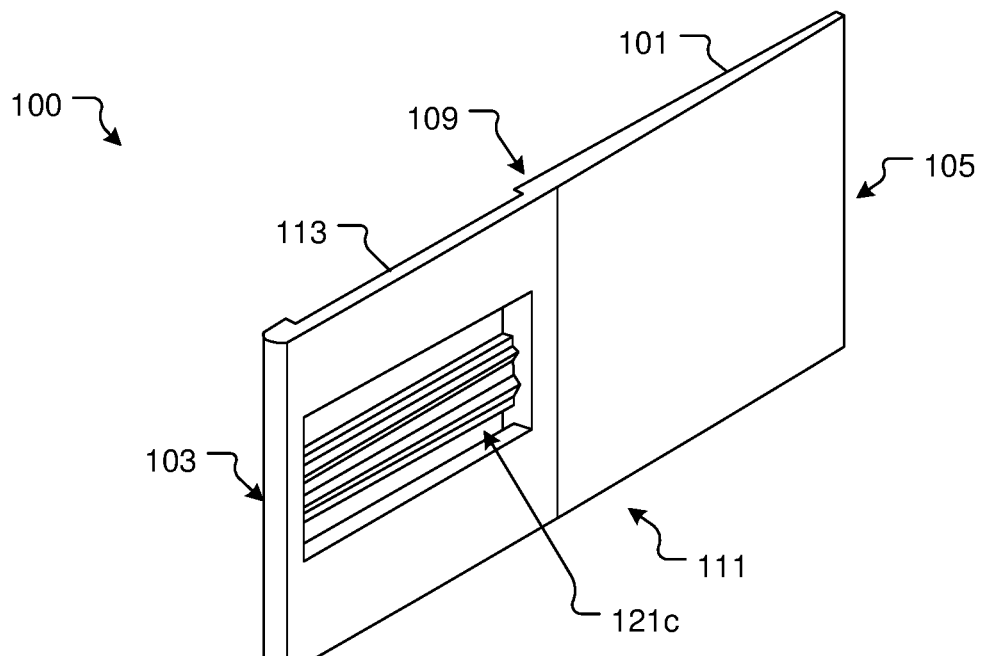
FIG. 2 is an opposite side perspective view of the retention strap stabilization device of FIG. 1.
Figure 3:
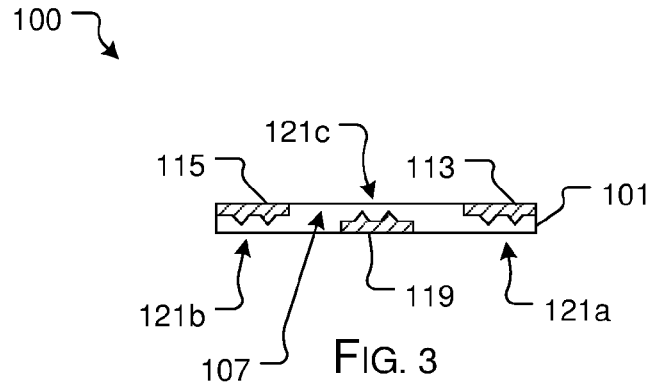
FIG. 3 is a cross-sectional front view of the retention strap stabilization device of FIG. 1.

Referring to the present invention in detail, FIG. 1 is a perspective view of the retention strap stabilization device 100 of the present invention. FIGS. 1-3 depict the present invention. The device 100 including a foil body 101. The body 101 having a rounded front end 103 that narrows to towards the back end 105. Attached to or integral to the foil body 101 is a retention slot 107 that passes from the top 109 of the body to the bottom 111 of body. The top 109 and bottom 111 of the slot 107 having a landing 113, 115 configured to grip a strap (not shown). The middle 117 of the slot also having a third landing 119 opposite the other landings 113, 115. Each landing 113,115,119 having a plurality of retention grips 121 rigidly attached or integral to the landings 113,115,119. The device 100 is removably attached to the strap via the slot 107 and retention grips 121. It is contemplated that retention grips 121 could be features such as ridges, dimples, angles, lines, cuts, or the like that improve the ability of the retention strap stabilization device 100 to grasp a strap.

FIG. 2 is a perspective view of the opposite side of the retention strap stabilization device 100 of FIG. 1. Retention grips 121 can be seen on the middle landing 119. Retention grips 121 are, in a similar arrangement, rigidly attached to and integral to the middle landing 119, facing in the opposite direction from the retention grips 121 of the top and bottom landings 113, 115. The slot 107 to accommodate a retention strap can also be seen.

FIG. 3 is a cross-sectional view of the retention strap stabilization device 100. Retention grips 121 can be seen along the middle landing 119 as well as the top and bottom landings respectively 113, 115.

Figure 4:
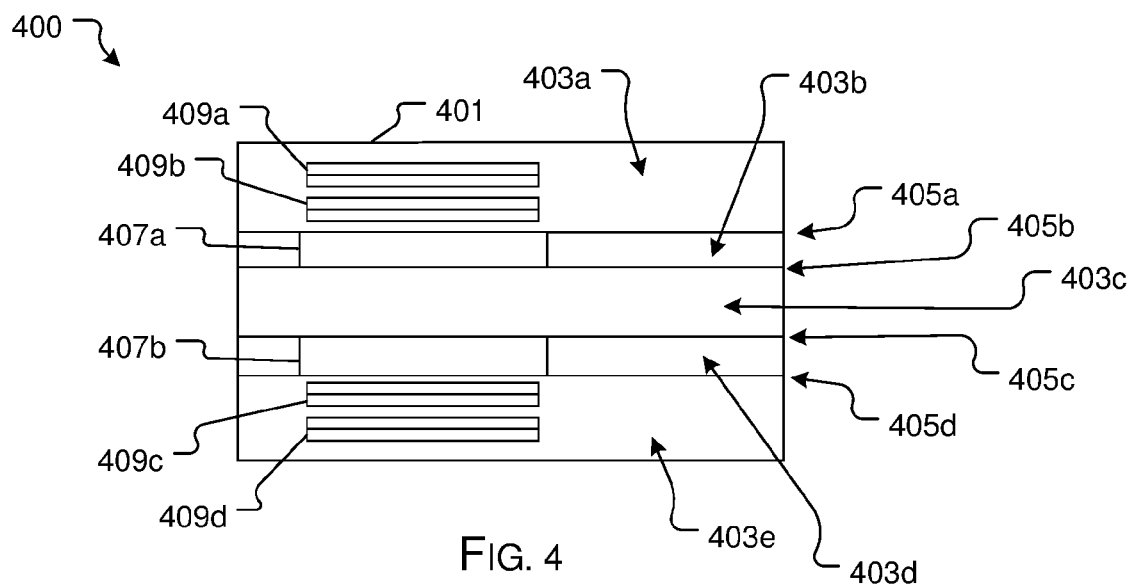
FIG. 4 is a side view of an alternative embodiment of the retention strap stabilization device of FIG. 1.

The foil body 101 of the present invention may also have varied geometric attributes. For example, the foil body 101 may have a plurality of foil surfaces 403 that are angled in relation to each other to further stabilize the foil under a variety of airflow conditions as depicted in FIG. 4, a side view of an alternative embodiment of the retention strap stabilization device 100 of the present invention. The embodiment 400 including a foil body 401 having a plurality of foil surfaces 403. The surfaces 403 are created by a plurality of angles 405 in the foil body 401. Each foil surface 403 is parallel to the adjacent foil surface 403 in a direction that is also parallel to an airflow vector while in use. The foil body 401 having a slot 407 that passes through at least two of the foil surfaces 403, creating openings for placement of a retention strap there through. The foil surfaces 403 also having retention grips 409 rigidly attached and integral to the foil body 401 in proximity to the slot so that when a retention strap is passed through the grips 409 are in direct contact with the strap.

Figure 5:
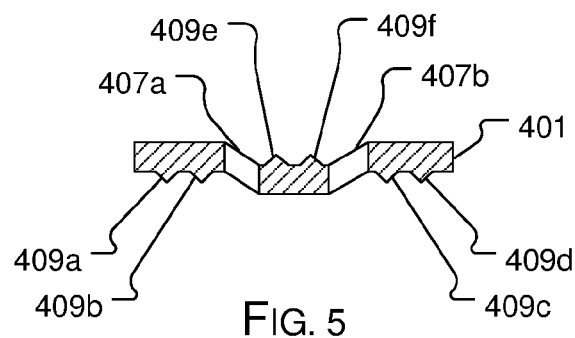
FIG. 5 is a cross-sectional front view of the alternative embodiment of FIG. 4.

FIG. 5 is a cross-sectional front view of the foil body 401 of the retention strap stabilization device 400 of FIG. 4 that shows the angles 405 of the foil body 401 previously described. Retention grips 409e and 409f that extend from foil surface 403c are oriented in the opposite direction as the grips 409a, 409b, 409c, and 409d. It will be appreciated that retention grips 121,409 are always intend to engage with the retention strap.

In some embodiments of the present invention, a break, slot or opening in the structure of the retention strap stabilization device allows for placement of the retention strap stabilization device on a retention strap. Another technique is to place the retention strap stabilization device on a retention strap closed in a clamshell fashion where two halves close together around a retention strap as depicted in FIGS. 6, 7A and 7B.

Figure 6:
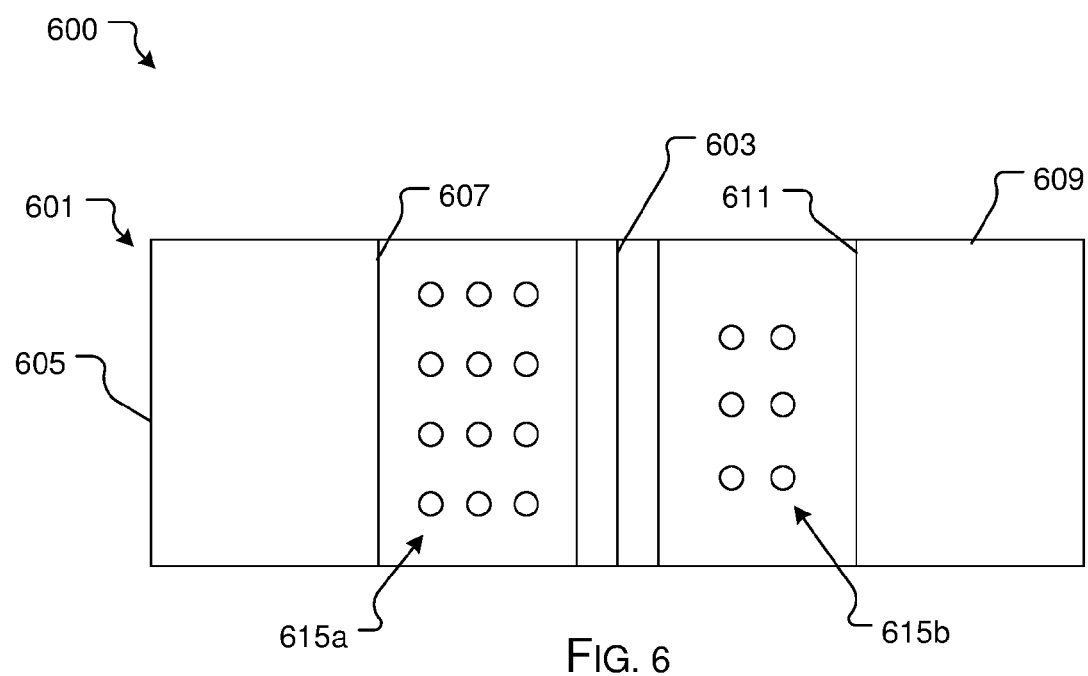
FIG. 6 is a top view of an alternative embodiment of the retention strap stabilization device of FIG. 1 in an open position.
Figure 7A:
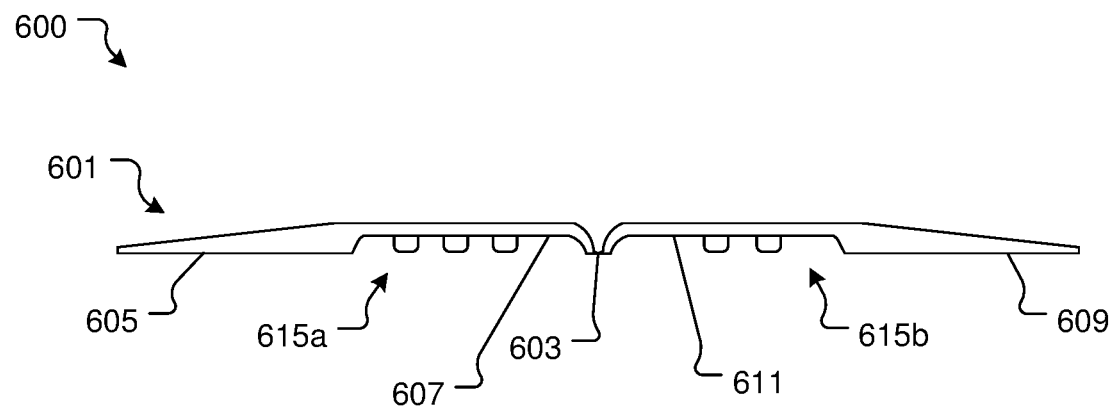
FIGS. 7A and 7B are top views of the alternative embodiment of FIG. 6 in an open and closed position respectively.
Figure 7B:
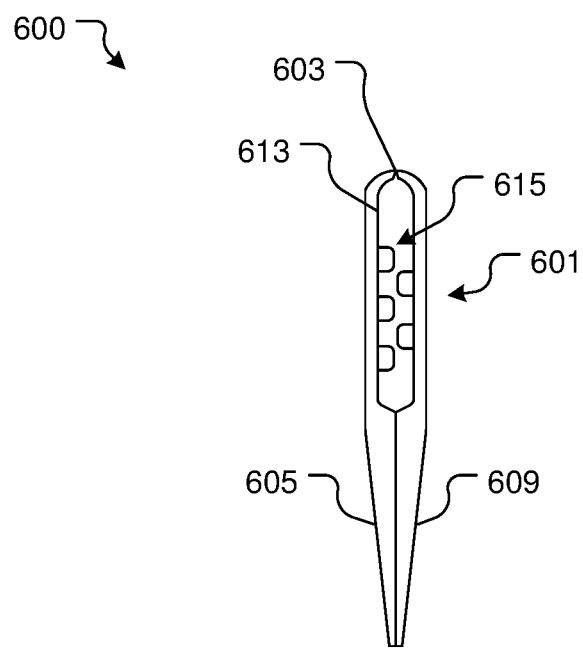

FIG. 6 is a side view of an alternative embodiment of the retention strap stabilization device 100 in an open position. Embodiment 600 having a foil body 601 of a pliable material and forms a hinge at the center line 603 of the body 601. The body 601 having a first side 605 with a pocket 607 and a second side 609 with a pocket 611. The first side 605 and second side 609 are configured so that when the body 601 is folded about the center line 603 pockets 607 and 611 form a slot 613 wherein a retention strap is surrounded and passes there through as depicted in FIGS. 7A and 7B. The pockets 607, 611 have a plurality of retention grips 615 that are rigidly attached and extend outward from the body 601. A taper or angle can also be seen on the foil body 601 to improve the aerodynamic properties.

Figure 8:
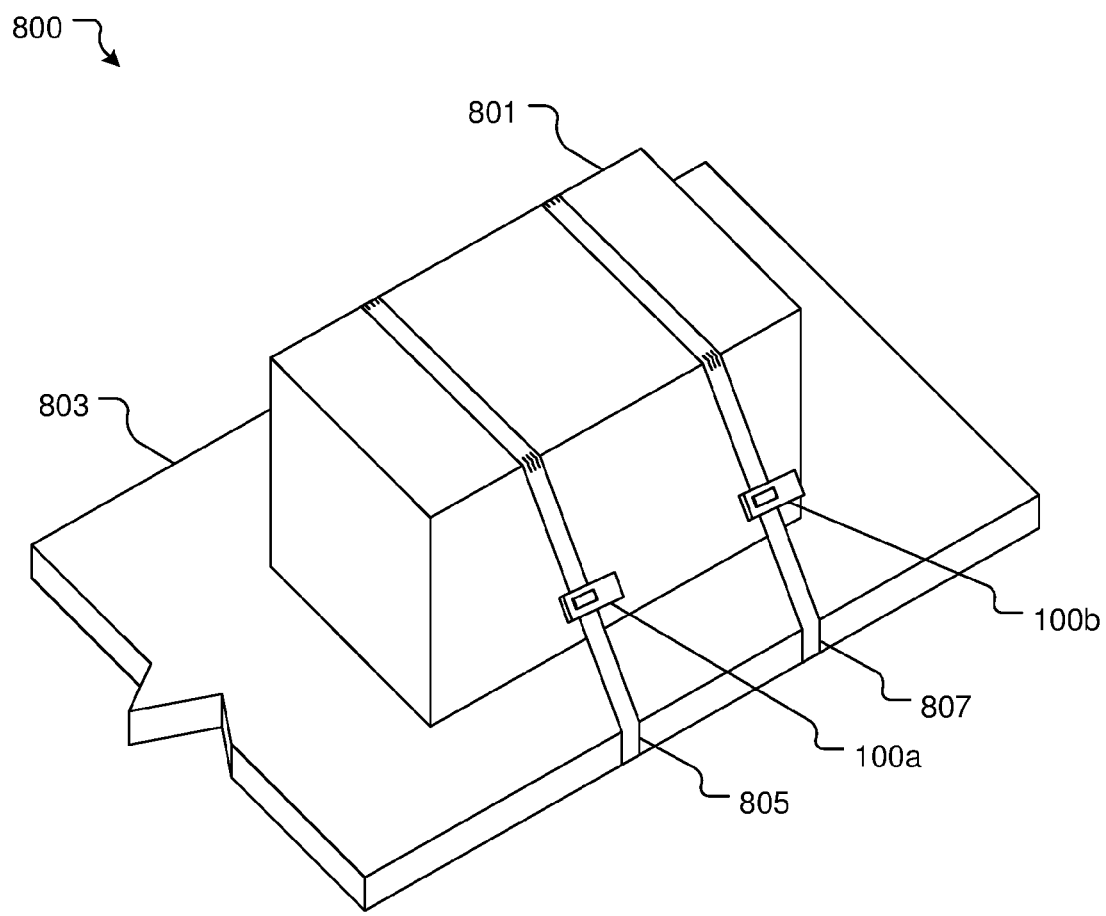
FIG. 8 depicts a close up of one embodiment of the retention strap stabilization device in use.

The use of a retention strap stabilization device 100,400, 600 is depicted in FIG. 8. Use 800, having a load 801 removably attached to a load bearing platform 803 via a plurality of retention straps 805 and 807. In this embodiment retention strap stabilization device 100 is depicted removably attached to retention straps 805, 807 by weaving the retention strap through the slot of the device 100, as previously described. It will be appreciated that device 600 would close in a clamshell fashion as previously described herein. It will also be appreciated that the retention straps could be secured to any load bearing platform such as a trailer, pallet or the like.

Other techniques to fasten the foil or foils to a retention strap may also be employed, and are considered to be within the spirit and broad scope of the present invention. In addition, other variations on the foil described herein may also be employed, and are also considered to be within the spirit and broad scope of the present invention.

It is, therefore, apparent that there has been provided, in accordance with the various objects of the present invention, a Retention Strap Stabilization Device 100,400, 600. It should be appreciated that one of the unique features believed characteristic of the present application is that foil bodies 101, 401, 601 respectively enable the device 100, 400, 600 to remove the vibrations from the retention straps 805, 807 while exposed to a passing air flow. It will be appreciated that retention grips 121, 409, 615 enable the respective device 100, 400, 600 to engage with the retention strap 805, 807. It will also be appreciated that retention grips 121, 409, 615 prevent movement of the device 100, 400, 600 with respect to the retention strap 805, 807.

Figure 9:
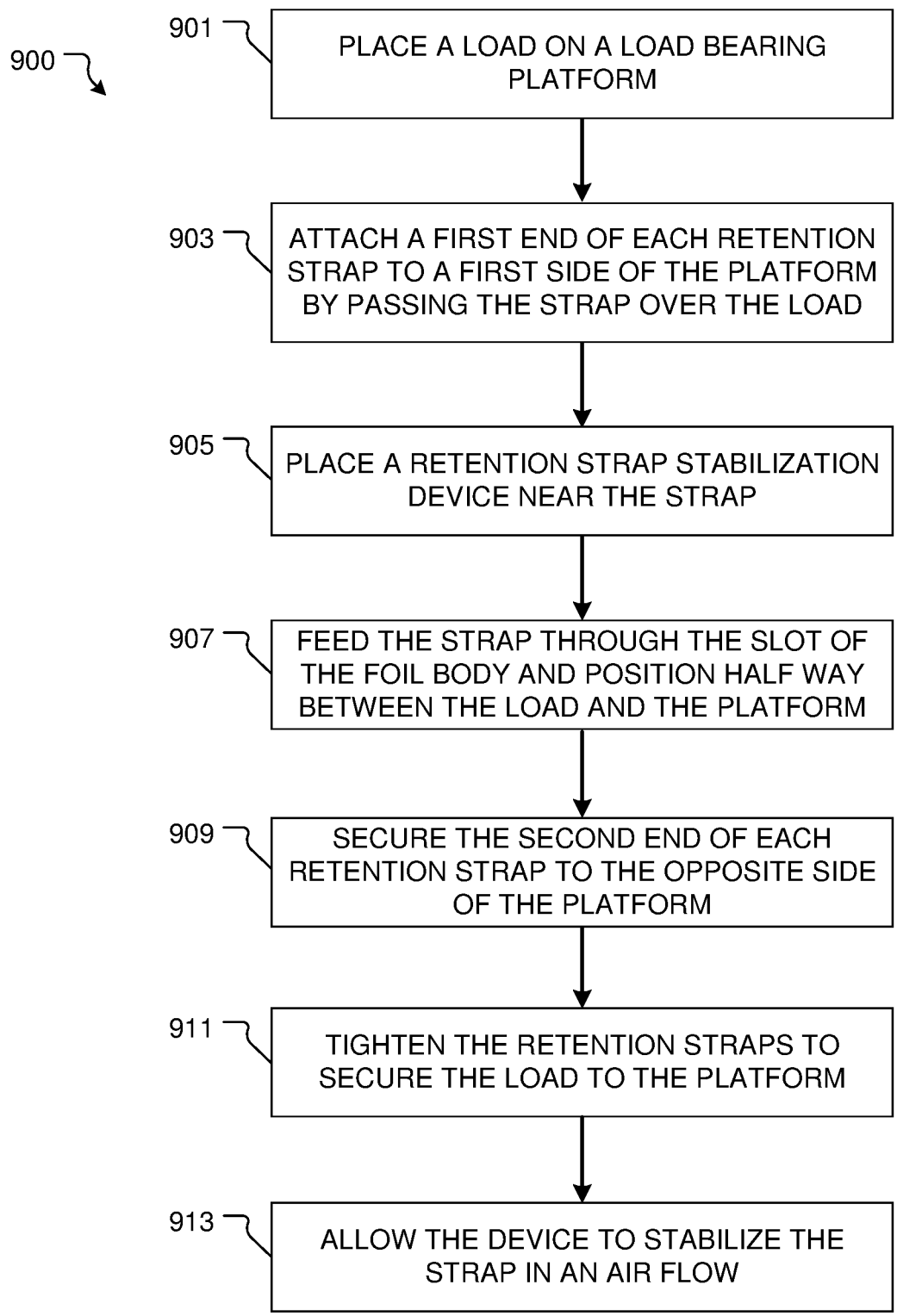
FIG. 9 is a flowchart of the preferred method of use of the device of FIG. 1.

Referring now to FIG. 9 the preferred method of use of the devices 100 and 400 is depicted. Method 900 including placing a load on a load bearing platform 901, attaching a first end of each retention strap to a first side of the platform by passing the strap over the load 903, placing a retention strap stabilization device near the strap 905, feeding the strap through the slot of the foil body and position it halfway between the load and the platform 907, securing the second end of each retention strap to the opposite side of the platform 909, tightening the retention straps to secure the load 911 and allowing the device to stabilize the strap in an air flow 913.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A retention strap stabilization device comprising:
   a foil body having a rounded front end and narrowing towards a back end; and
   a slot passing through the body from a top end to a the bottom end to allow a retention strap to pass there through;
   the slot having:
      a landing across the top end;
      a landing across a middle of the body; and
      a landing across the bottom end where the middle landing is on the opposite side of the slot from the other landings;
         the landings having a plurality of retention grips rigidly attached and extending into the slot;
   wherein the slot and retention grips hold the device in contact with a retention strap; and
   wherein the foil body reduces or eliminates vibrations in the retention strap caused by an air flow passing over the strap.

2. The device of claim 1 wherein the retention grips comprise ridges parallel to the slot.

3. The device of claim 1 wherein the retention grips comprise spikes.

4. The device of claim 1 wherein the retention grips comprise zig-zag style ridges.

5. The device of claim 1 wherein the retention grips comprise dimples.

6. The device of claim 1 wherein the foil body comprises a plurality of foil surfaces that are parallel to each other and formed by a plurality of angles in the foil body;
   the foil body having the slot which passes through at least two of the foil surfaces to allow a retention strap to pass there through; and the foil surfaces having the plurality of retention grips rigidly attached and extending towards the slot so as to come in contact with the retention strap.

7. A method of reducing vibrations in a retention strap using the device of claim 1 comprising:
   placing a load on a load bearing platform;
   attaching a first end of a retention strap over the load and to a first side of the platform;
   placing the retention strap stabilization device near the strap;
   feeding the strap through the slot of the foil body and positioning it half way between the load and the platform;
   securing a second end of the retention strap to an opposite side of the platform;
   tightening the retention strap to secure the load; and
   allowing the device to stabilize the strap in an air flow.

* * * * *